July 16, 1940.
A. A. NORIN
2,208,041
POWER DEVICE
Filed Nov. 19, 1938
2 Sheets-Sheet 1
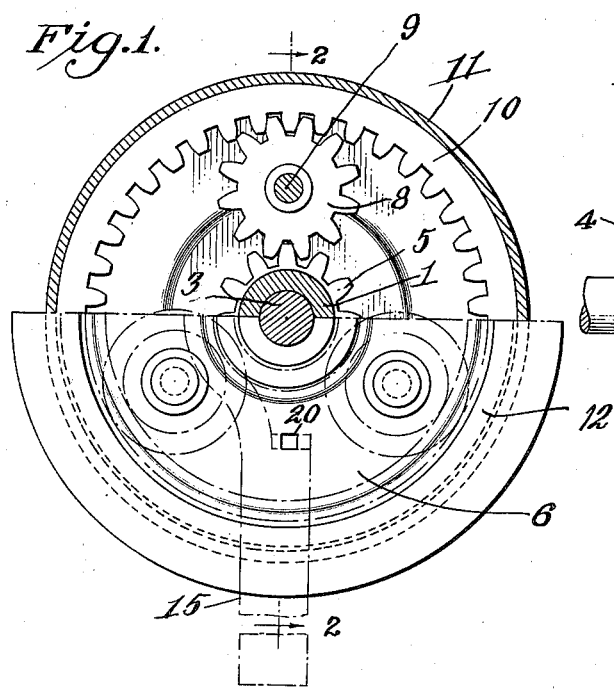
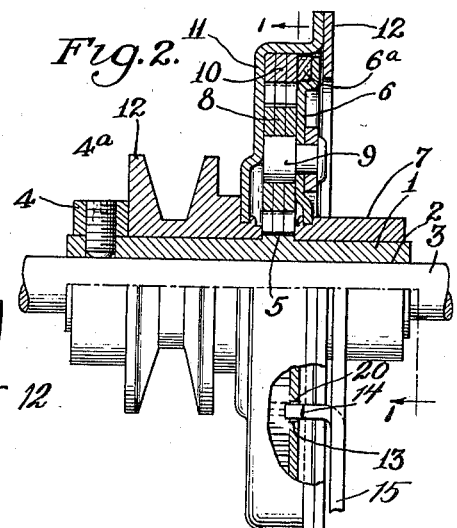
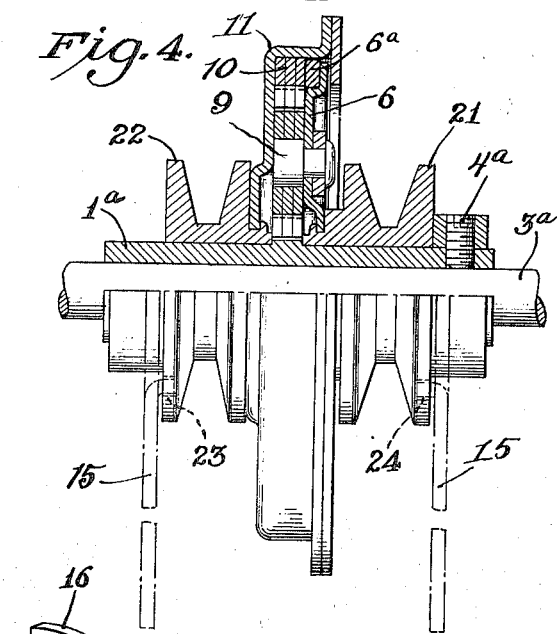
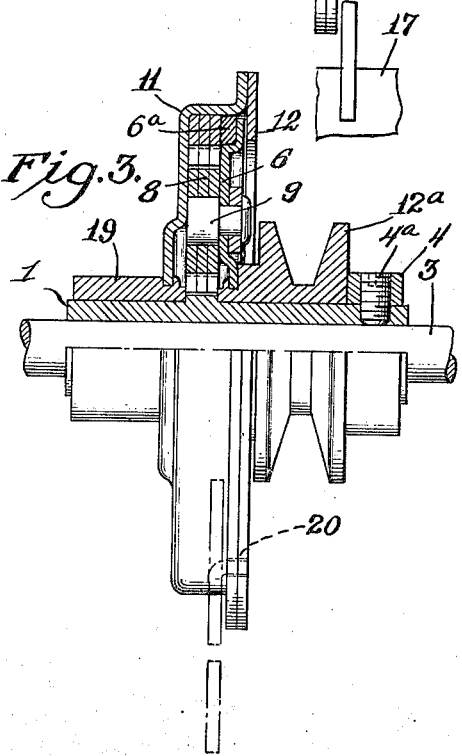
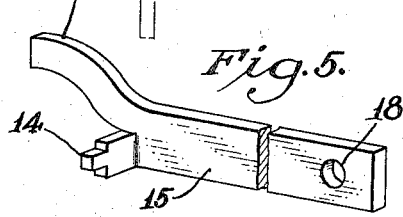
Inventor
Allan A. Norin
BY
Ames, Thiess, Olson & Mechlenburger,
Attys.

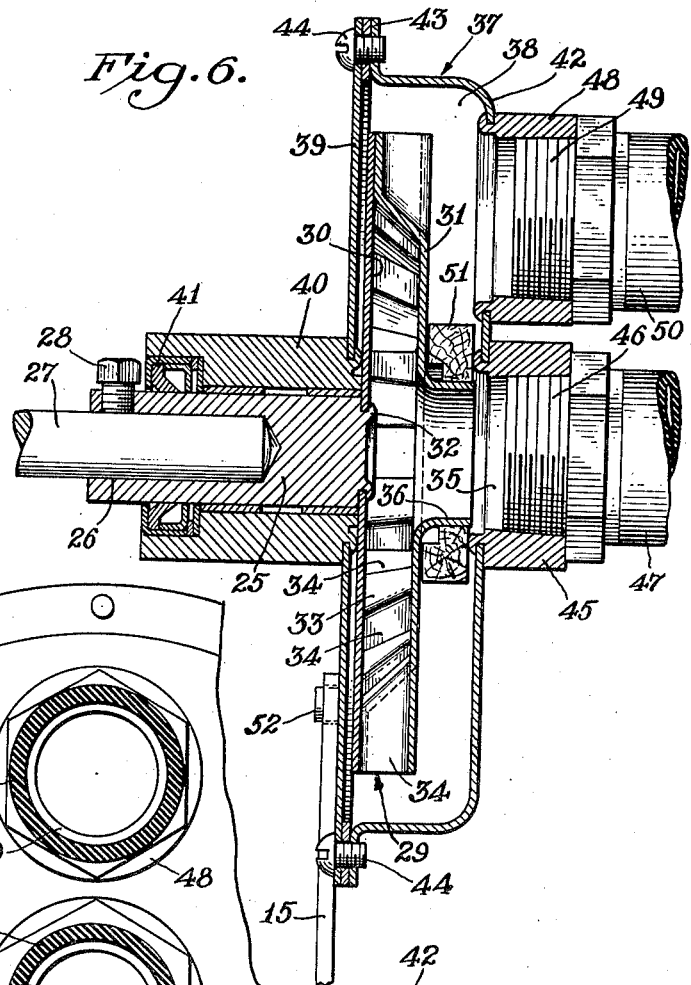
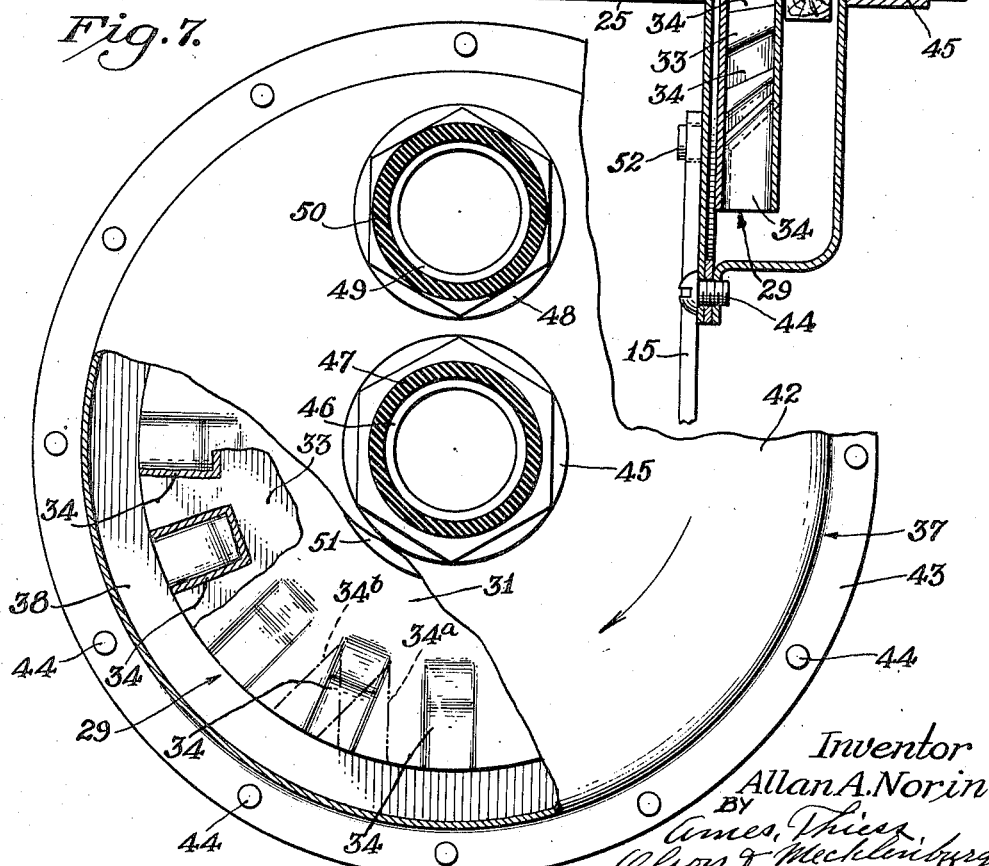

Patented July 16, 1940

2,208,041

UNITED STATES PATENT OFFICE 2,208,041

POWER DEVICE

Allan A. Norin, Chicago, Ill.

Application November 19, 1938, Serial No. 241,326

5 Claims. (Cl. 74—291)

This invention relates to power operated devices, and more particularly to comparatively small power driven devices which may be supported on a single shaft, which latter may be a power shaft for operating the device or may be a stationary shaft, and in which all the operating mechanism is preferably concentric with the shaft.

An important object of the invention is to provide a device of the character described which may be mounted on a single shaft and which is made operative by means of a member independent of the support for preventing rotation of one or more of the elements.

A further object is the provision of a small, compact, self-contained shaft-mounted power-applying device which is made effective for applying power merely by preventing rotation of one of the shaft-supported elements and which may easily be mounted on or removed from any suitable supporting shaft.

A further object is the provision of a variable speed mechanism adapted to be supported only on a shaft and in which a plurality of rotatable elements are axial with the shaft and various speed ratios may selectively be obtained by preventing rotation of a selected element whereby the power output is delivered through a predetermined path.

The invention is particularly adaptable for use in connection with small variable speed transmissions or rotary pumps and the like. Such devices are ordinarily mounted on a base provided with suitable bearings in which the various elements are rotatably supported on a base and are driven by means of an independently supported drive shaft, the power being delivered from a power output member which may also be mounted independently of the power shaft.

The invention enables the production of an exceedingly small compact device which is particularly suitable for small machines such as commonly used in amateur workshops. Usually, variable speed mechanisms, pumps, etc., of the production type are expensive and not practical for use in amateur shops because of their size and also because they must be permanently mounted and are not adaptable for quick and easy application to various small machines to supply a variable output.

The present invention contemplates a small, compact, and inexpensive structure which may be applied directly to small motor shafts or to any fixed or rotatable shaft and which may easily and quickly be installed for operation and as easily removed from its support.

It is an object of the invention to provide a small compact device of the character described which will be inexpensive, of few parts, easy to assemble, and which will not easily get out of order.

Further objects will be apparent from the specification and the appended claims.

In the drawings:

Fig. 1 is an end elevation of one embodiment of the invention with a portion shown in section on a line substantially corresponding to line 1—1 of Fig. 2. The shaft on which the device is supported is also shown in section.

Fig. 2 is a side elevation of the embodiment illustrated in Fig. 1 and is partially in section on a line substantially corresponding to line 2—2 of Fig. 1.

Fig. 3 is a view substantially like Fig. 2 but illustrates an embodiment having a somewhat different driving arrangement whereby different speed ratios may be obtained.

Fig. 4 illustrates another embodiment in which a somewhat greater range of speed ratios may be obtained.

Fig. 5 illustrates an interchangeable stop member or handle for preventing rotation of one of various rotatable elements.

Fig. 6 is an axial section through another embodiment of the invention as applied to a centrifugal pump.

Fig. 7 is a front elevation of the embodiment illustrated in Fig. 6, a portion being broken away for purposes of illustration.

Referring to the drawings in detail, the embodiment illustrated in Figs. 1 and 2 comprises a variable speed transmission unit having an axial bushing or bearing member 1 with a longitudinal bore 2 therethrough. These variable speed mechanisms are particularly adapted for use in connection with comparatively small power machines and the bore 2 is ordinarily ½" in diameter, although it will be understood that the device may be of any suitable size and adapted to be supported on any suitable size shaft, the ½" diameter being preferable in order that the device may be mounted on standard small shafts 3, such as those of the usual low power motors.

The shaft 3 may, of course, be a rotatable power driven shaft such as a motor shaft, or it may be merely a suitable rod inserted in the chuck of a lathe or drill press, and in some cases may be a nonrotatable fixed shaft. The bushing 1 is provided with a collar 4 adjacent one end, and this collar is provided with a setscrew 4a which extends through the bushing 1, whereby the bushing and collar may be locked securely for rotation with the shaft or may be prevented from rotation when a stationary shaft is used. A sun gear 5 is preferably integral with the bushing intermediate its ends. The device may comprise a gear arrangement and substantially the entire device, including the gears, may be made from sheet metal. Gears for larger sizes may be rough punched and then sized by shearing dies when greater accuracy is desired. The construction disclosed is, therefore, adaptable for either large or small units.

A cage 6, comprising a sheet metal plate, is rigidly secured to a hub 7 rotatably mounted on the bushing 1, as shown in Fig. 2, and this cage is formed as illustrated to bring an annular portion of its inner surface into alignment with one side of the gear 5. Radially positioned gears 8 are rotatably mounted on stub bearings 9, which are rigidly secured to the cage as shown, and these gears are, of course, in mesh with the gear 5. The gears are each preferably formed of a plurality of sheet metal stampings, any suitable number of which may be used, and easily assembled by placing them on the stub bearings 9. A gear 10 is in mesh with the gears, as shown, and is also preferably made of a plurality of stampings, which may be a press fit in a cup-like sheet metal casing 11, which is provided with a retaining ring 12 secured thereto by spot welding or which may removably be secured by screws if desired. The retaining ring 12 overlaps the cage 6, as shown, whereby the entire device is retained in assembled relation. The outer edge of the cage 6 is formed as shown to provide a seat for a sealing ring 6a, which may be of felt or any other suitable material to provide a so-called grease seal whereby the casing may be filled with grease or oil, if desired, without danger of leakage.

The casing 11 is rigidly secured to a V pulley 12 which is rotatably mounted on the bushing 1, as shown. It will be understod, of course, that the gear 5 may be formed of separate sheet metal gear members secured to the shaft either by a press fit thereon or by a suitable key, as desired.

In the embodiment shown in Fig. 2, the cage 6 is provided with an opening 13 arranged to receive a laterally extending lug 14 on a removable stop member or handle 15 (Fig. 5). This handle comprises an elongated member having an arm 16 which is adapted to engage the hub or other suitable portion of the device. The laterally extending lug 14 is adjacent the end of the stop member and is adapted to be inserted in the opening 13 when the device is in use, as shown in Fig. 2. The opposite end of the stop member may rest against any suitable fixed member 17, such as the side frame of a lathe or a motor support, whereby rotation of the cage is prevented. The handle may also be provided with a suitable hole 18 whereby it may, if desired, be bolted to a support to prevent rotation.

When the handle 15 is in position, as shown, it will effectively prevent rotation of the cage 6. Therefore, in the particular embodiment disclosed, if the shaft 3 is driven, a speed reduction ratio of 1 to 3 may be obtained between the shaft and the pulley 12, which latter is rotated by the gear and casing 11. Also, if driving power is applied to the pulley 12, the shaft 3 may be driven at a 3 to 1 ratio. It will be understood, of course, that these ratios may be changed by adopting other gear ratios in the transmission.

Fig. 3 illustrates another embodiment in which the casing 11 is rigidly secured to a bushing 19 rotatably mounted on the bearing bushing 1. Also, a pulley 12a is rotatably mounted on the bushing 1 and rigidly secured to the cage 6 to rotate therewith. In this embodiment, when the shaft 3 is driven, the stop handle 15 may be applied to the casing 11 by inserting the lug 14 in a suitable opening 20 in the flange of the casing and the pulley 12a will then be driven from the shaft at a 1 to 4 slower ratio. Also, if power is applied to the pulley 12a, the shaft will be driven at a 4 to 1 faster ratio.

Fig. 4 illustrates an embodiment in which a similar bushing 1a is secured to a nonrotatable shaft 3a whereby the bushing is at all times prevented from rotation. In this embodiment a pulley 21 is rigidly secured to the cage 6 and another pulley 22 is rigidly secured to the casing 11. In this embodiment power may be applied either to the pulley 21 or to the pulley 22. When power is applied to the pulley 21, the pulley 22 will be driven through the ring gear by means of the casing 11 at a 1 to 1.333 faster ratio. If power is applied to the pulley 22, the pulley 21 will be driven through the cage from the planet gears at a 1 to 0.75 slower ratio. This same embodiment may, if desired, be mounted on a rotatable shaft with the bushing 1a secured thereto in the same manner as previously described. When used in this manner, the casing 11 may be prevented from rotation by inserting the lug 14 of the handle into an opening 23 in the pulley 22, or the cage 6 may be held against rotation by inserting the handle lug 14 into an opening 24 in the pulley 21. In either case, the power output from the rotated pulley will provide a predetermined speed ratio with respect to the shaft 3a.

It will be obvious that the handle 15 for preventing rotation may be of any suitable type by which it may engage any selected one of the elements to prevent rotation thereof and may be interchangeable in the various positions.

Figs. 6 and 7 illustrate another embodiment of the invention comprising a centrifugal pump which is substantially entirely made of sheet metal and is a small size portable device which may quickly and easily be attached to a small motor shaft or to any power driven member such as a rod inserted in a lathe chuck or drill press. The particular embodiment illustrated comprises a small diameter, comparatively short mandrel 25 having an opening 26 in one end thereof to receive the end of any suitable small power shaft 27. The mandrel may be secured to the shaft in any suitable manner, such as by a set screw 28, whereby it will be driven by the shaft. The mandrel 25 forms the hub of a rotor 29, and this rotor comprises two sheet metal disc-like members 30 and 31. The member 30 is axially secured to the hub by riveting thereon through a central opening, as shown at 32. The disc 31 is secured to the disc 30 at the marginal edges thereof and is formed to provide a comparatively small rotor chamber 33 therebetween. The discs are secured together adjacent their marginal edges and are so formed as to provide radial outlets 34. The disc 31 is formed to provide an axial inlet 35 formed by an outwardly extending flange 36. The radial outlets 34 may be radially aligned as shown in Fig. 7 or they may be angularly positioned as shown by dotted lines 34a or 34b.

When the rotor moves in the direction of the arrow and the outlets are angular in the direction shown by the dotted lines 34a, the pump will provide greater delivery and less pressure. With the device operating in the same direction and the outlets angular in the opposite direction as shown by dotted lines 34b, there will be less delivery at a greater pressure. A casing 37 is provided for the rotor and is slightly larger in diameter and also slightly wider than the rotor in order to provide a chamber 38 therebetween. The casing comprises a sheet metal disc 39 secured to a hub 40 which is a running fit on the rotor hub 25 and may be provided with a liquid seal 41 which will prevent any fluid flow between the bearing surfaces.

A cup-shaped sheet metal casing member 42 is provided with a flange 43 of the same diameter as the disc 39 and to which it may be secured by means of screws 44, or the parts may be secured together in any other suitable manner, preferably so that they may be separated if desired. The casing member 42 is provided with a threaded inlet bushing 45 which is adapted to receive a hose coupling 46 for a flexible hose 47. The casing is also provided with an outlet bushing 48 adapted to receive a coupling member 49 for securing a flexible hose 50 thereto. The casing outlet and rotor outlet are in axial alignment with the drive shaft and the rotor is spaced somewhat from the front of the casing, and a sealing ring 51 is loosely mounted on the flange 36 of the inlet 35 and bears against the inturned riveted portion of the inlet bushing 45 within the casing. The sealing ring 51 is preferably of impregnated wood and is of such size and shape that pressure within the pump causes it to seal against the inturned flange of the bushing.

It will be apparent that this embodiment may be made almost entirely of sheet metal, is very cheap to construct, and is efficient in operation. Also, the handle 15 previously described may be applied to the casing 37 in the same manner as previously described. This handle may manually be held to prevent rotation of the casing or may rest against any fixed member. It may removably be attached to the casing in any suitable manner such as by a clip or clips 52.

Modifications may be made without departing from the spirit of the invention, and it is desired, therefore, that the invention be limited only to the prior art and the scope of the appended claims.

Having thus described this invention, what is claimed and desired to be secured by Letters Patent is:

1. A self-contained speed change unit adapted to be interchangeably mountable for sole support on standard shafts of small power tools, comprising a bushing having a sliding fit on said standard shafts and having a concentric gear fixed intermediate its ends, a cup-like casing rotatably mounted on said bushing closely adjacent said gear, an axial pulley or the like secured to said casing, a ring gear secured in said casing, a cage plate rotatably mounted on said bushing closely adjacent said bushing gear, said cage plate and said casing being related to form a substantially closed housing for all of said gears, one or more radially positioned pinions on said cage plate and meshing with said bushing gear and said ring gear, means on said bushing for removably securing said bushing rigidly to any of said standard shafts, and manually controllable means for returning said cage from rotation.

2. A self-contained speed change unit adapted to be interchangeably mountable for sole support on standard shafts of small power tools, comprising a bushing having a sliding fit on said standard shafts and having a concentric gear fixed intermediate its ends, a ring gear disc rotatably mounted on said bushing closely adjacent said bushing gear, a ring gear on said disc, a cage disc rotatably mounted on said bushing and closely adjacent the opposite side of said bushing gear, pinions on said cage disc and meshing with said ring gear and said bushing gear, the peripheral portions of said discs being co-operatively related to form a substantially closed housing for all of said gears, an axial pulley or the like secured to one of said discs, means for securing said bushing rigidly to any of said standard shafts, and manually controllable means to restrain one of said discs against rotation.

3. A self-contained speed change unit adapted to be interchangeably mountable for sole support on standard shafts of small power tools, comprising a bushing having a sliding fit on said standard shafts and having a concentric gear fixed intermediate its ends, a ring gear disc rotatably mounted on said bushing closely adjacent said bushing gear, a ring gear on said disc, a cage disc rotatably mounted on said bushing and closely adjacent the opposite side of said bushing gear, pinions on said cage disc and meshing with said ring gear and said bushing gear, the peripheral portions of said discs being co-operatively related to form a substantially closed housing for all of said gears, an axial pulley or the like secured to one of said discs, means for securing said bushing rigidly to any of said standard shafts, and manually controllable means for preventing rotation of one of said discs.

4. A self-contained speed change unit adapted to be interchangeably mountable for sole support on small diameter standard shafts of small power tools, comprising a bushing having a sliding fit on said shafts, a gear fixed on said bushing intermediate its ends, a pair of disc-like housing members rotatably mounted on said bushing, one on each side of and closely adjacent said gear, the peripheral portions of said members being related to form a shallow housing, a ring gear in said housing on one of said members, radially disposed pinions on the other member and meshing with said bushing gear and said ring gear, a concentric pulley or the like secured to each of said members, means for securing said bushing to said shaft, and manually controllable means for preventing rotation of one of said members.

5. A self-contained speed change unit adapted to be interchangeably mountable for sole support on small diameter standard shafts of small power tools, comprising a bushing having a sliding fit on said shafts, a gear fixed on said bushing intermediate its ends, a pair of disc-like housing members rotatably mounted on said bushing, one on each side of and closely adjacent said gear, the peripheral portions of said members being related to form a shallow housing, a ring gear in said housing on one of said members, radially disposed pinions on the other member and meshing with said bushing gear and said ring gear, a concentric pulley or the like secured to each of said members, means for securing said bushing to said shaft, and manually controllable means for preventing rotation of one of said members.

ALLAN A. NORIN.